H. SYNCK.
BEATING CYLINDER FOR MANURE SPREADERS.
APPLICATION FILED APR. 26, 1912.
1,057,896.
Patented Apr. 1, 1913.
2 SHEETS—SHEET 1.
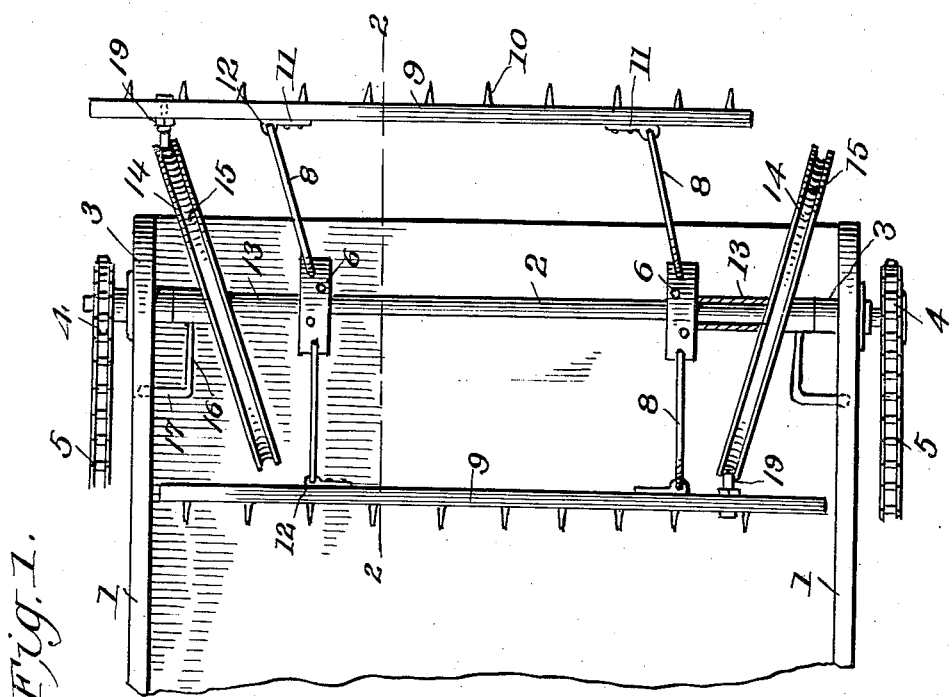
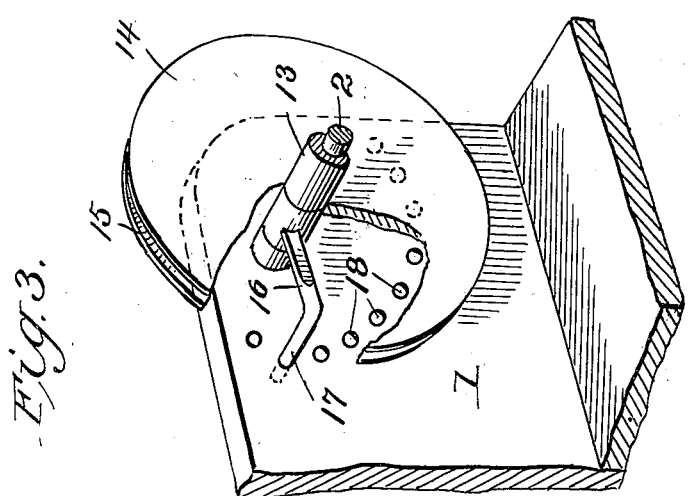
Witnesses
Inventor
H. Synck
By
Attorneys

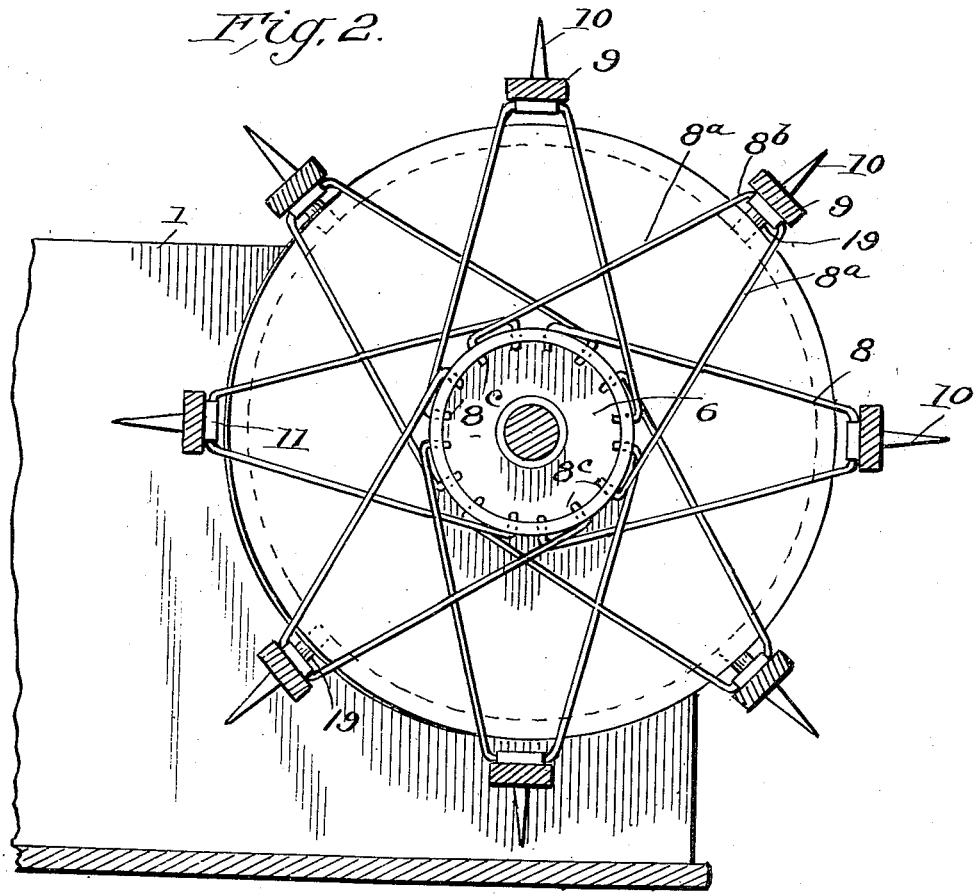

UNITED STATES PATENT OFFICE.

HENRY SYNCK, OF COLDWATER, OHIO, ASSIGNOR TO NEW IDEA SPREADER COMPANY, OF COLDWATER, OHIO.

BEATING-CYLINDER FOR MANURE-SPREADERS.

1,057,896.  Specification of Letters Patent.  Patented Apr. 1, 1913.

Application filed April 26, 1912. Serial No. 693,381.

*To all whom it may concern:*

Be it known that I, HENRY SYNCK, citizen of the United States, residing at Coldwater, in the county of Mercer and State of Ohio, have invented certain new and useful Improvements in Beating-Cylinders for Manure-Spreaders, of which the following is a specification.

My invention relates to fertilizer distributers of that class wherein one or more cylinders are provided for primarily pulverizing fertilizer, repulverizing or distributing the same, or for distributing the fertilizer alone after it has been pulverized. In this class of devices there is ordinarily provided a cylinder or cylinders formed by placing hubs upon a shaft and fastening thereto transversely extending bars provided with teeth or paddles. This cylinder simply rotates in a plane parallel to the longitudinal axis of the wagon and hence does not spread or shift the fertilizer laterally to an extent wider than the bed of the wagon, but throws the material straight out backward.

The primary object of my invention is to provide means whereby the spread of the fertilizer may be widened, and in this connection to provide means whereby if desired the auxiliary distributer may be omitted and provide a pulverizing cylinder which will not only pulverize the material, but will distribute the same laterally without the necessity of using an auxiliary cylinder for distributing the material.

A further object is to provide a cylinder composed of laterally reciprocable distributing elements, and provide in this connection means whereby these elements may be shifted laterally either early or late in the cycle of operations, thus making a wider or narrower spread as desired.

A further object is to provide a mechanism of this character so formed that by a slight modification the distributing elements may either be shifted from the middle toward one side of the bed, or from the middle toward both sides of the bed.

Another object is to provide a cylinder of the character above stated, which may be used in place of the ordinary cylinder, and which may be operated by the means usually used for operating the cylinders of beaters of fertilizer distributing machines.

Other objects will appear in the course of the following description.

My invention is illustrated in the accompanying drawings wherein:

Figure 1 is a plan view of the rear end of a fertilizer distributing wagon showing my improved distributer applied thereto. Only two toothed distributing members are shown so as to avoid obscuring the vital mechanical construction of the invention. Fig. 2 is an enlarged transverse section on the line 2—2 of Fig. 1 looking in the direction of the arrows but showing a plurality of distributing elements in place of the two illustrated in Fig. 1. Fig. 3 is a fragmentary perspective detail view showing the shaft, the cam mounted thereon, and the means whereby the cam is locked in any desired adjusted position. Fig. 4 is a fragmentary detail view of a portion of one of the cams, a fragment of one of the distributing bars and the roller forming the means whereby the distributing bar is engaged by the cam. Fig. 5 is a fragmentary transverse section through one of the hubs mounted upon the shaft, the figure showing the construction of the hub and the manner in which the links are connected thereto.

Corresponding and like parts are referred to in the following description and indicated in all the views of the accompanying drawings by the same reference characters.

In the drawings, 1 designates the sides of the body of a fertilizer distributer of any ordinary construction, and mounted in any suitable manner in the rear ends of these sides is a transversely extending shaft 2, this shaft being supported in bearings 3 of any suitable character. The shaft is provided with sprocket wheels 4 over which pass sprocket chains 5 by which the shaft may be rotated. As my invention does not lie in the mechanism for rotating the shaft, no mechanism of this character is shown. Mounted upon the shaft adjacent the ends thereof are hubs 6 which are attached to the shaft in any suitable manner and which as shown are disk-like in form and have laterally extending flanges 7. Swingingly connected to these hubs 6 and specifically to the flanges 7 of the hubs are the radially extending links 8 which at their outer ends are pivotally connected to laterally reciprocatable elements 9 having the form of bars and provided with outwardly projecting pins 10.

While I do not wish to be limited to the precise means whereby the links 8 are connected to the hubs 6 or connected to the bars 9, I preferably form these links as illustrated in Fig. 2, that is, the links are approximately V-shaped so as to provide opposed converging legs 8$^a$ and a cross bar 8$^b$. Each leg of the link is inwardly bent at its extremity as at 8$^c$. These inwardly turned ends 8$^c$ engage in perforations passing through the flange 7 so that the link is permitted to have a swinging movement parallel to the axis of the hub. The bars 9 are each provided with oppositely disposed clips 11, these clips being attached to the inner face of the bar in any suitable manner and being provided with eyes 12 which engage around the cross bar 8$^b$, thus providing a hinge joint between the link and the bar and permitting the bar to remain parallel to the shaft 2 when the links and bar are reciprocated laterally. There may be as many of these bars 9 as desired, and there will be a corresponding number of links engaging with each hub, these links being of course arranged in staggered relation to each other so as to permit certain links to shift laterally in one direction as to the left, while certain other alternately arranged links shift laterally in the other direction, that is, to the right. For the purpose of reciprocating these bars laterally, I provide cam members, and preferably provide two of these members, one located at each end of the shaft 2, these cam members being so arranged as to guide and laterally shift the bars 9 and being set reversely to each other. Each cam member consists of a sleeve or like element 13 surrounding the shaft 2 and preferably disposed between the adjacent hub 6 and the bearing 3. The shaft 2 revolves within this sleeve. Each sleeve carries upon it the angularly disposed cam disk 14 having a cam track 15 in its periphery. Each disk is set at an angle to the longitudinal axis of the body, the two disks being set as to diverge rearwardly with relation to each other. In order to hold the disks from any movement with the shaft and yet permit the disks to be adjusted to any desired rotatable position, I provide each sleeve 13 with a radially disposed arm 16 having an outwardly turned extremity 17 which engages in an opening or perforation 18 in the adjacent side 2 of the wagon. There are preferably provided a series of these openings 18 arranged in the arc of a circle and in which these outwardly extending terminal ends 17 may be engaged. The cam members 14 have of course a form which will accommodate the inward movement of the bars 9 and the outward movement thereof incident to the reciprocation of the bars. Each bar 9 is provided with an inwardly projecting member 19 which engages with the cam track 15 and which as shown is bolted to the bar. This member may carry an antifriction roller or any other suitable means for engaging the cam track with as little friction as possible.

It will be understood of course that there are as many of the elements 9 as necessary, and that the alternate elements engage with one of the cam members 14 while the intermediate elements engage with the other cam member 14 so that a number of elements 9 swing to the left while alternate elements 9 swing to the right. By varying the arrangement of the bars and their engagement with the cam elements, any number of the bars may be shifted to one side, and any number to the other side, or all of the elements may be made to swing to one side or to the other side. In this way the machine may be made to only spread to one side, or to spread laterally to both sides.

I do not wish to be limited to the precise construction shown as it is evident that many modifications thereof might be made, but the main object of the invention is to provide a construction in which the bar carrying teeth, paddles or like devices reciprocate laterally for the purpose of throwing the fertilizer laterally. The cylinder thus constructed can be used either as a primary pulverizing cylinder or as a repulverizer and distributing cylinder with any fertilizer distributer that already has the ordinary pulverizing cylinder, by simply setting my improved cylinder back of the pulverizing cylinder or in a position that it will engage the fertilizer being discharged and direct this discharge laterally.

My invention is simple, can be easily attached and used with any ordinary construction of fertilizer distributer and is entirely effective for the purpose specified.

It will be noted that the instant of sidewise movement and the rapidity of this sidewise movement of the distributing members will depend upon the shape of the cam, and that while as illustrated the cams 14 are arranged with a uniform slant so as to give a uniform reciprocation to the distributing bars, yet the cams might be so formed without any departure from the spirit of the invention as to give a regular circular movement for a portion of their rotation and then give a rapid lateral movement which would tend to throw the fertilizer outward from the distributing members and off from the pins, teeth or paddles carried thereby. This ability to reciprocate the distributing members 9 may thus be used, not only to discharge material laterally, but to disintegrate the fertilizer so as to put it in better condition for distribution.

What I claim is:

1. A beater for fertilizer distributers including transversely extending distributing members, alternate distributing members being movable in one direction from the middle of the machine laterally outward, the other distributing members being movable in the other direction, means for carrying said members in a closed path, and means for transversely reciprocating one set of the distributing members in one direction from the middle of the machine laterally outward and the other set of distributing members laterally outward in the other direction to the first set.

2. A beater for fertilizer distributers including two sets of distributing elements movable in a circular closed path and laterally reciprocable, the elements of each set extending transversely and overlapping the elements of the other set, the elements of one set alternating with the elements of the other set, and fixed cams with which said distributing elements are operatively connected, said cams being set at different angles, one of the cams being operatively connected to one of the sets of distributing elements and the other cam to the other set of distributing elements, said cams acting to reciprocate the distributing elements laterally as they rotate.

3. A beater for fertilizer distributers including a plurality of sets of distributing elements, each distributing element extending transversely across the entire distributer and the distributing elements of one set being parallel to but overlapping the distributing elements of the other set, all of said distributing elements being movable in a circular path, and means for reciprocating said sets in opposite directions as they rotate.

4. A beater for fertilizer distributers including a rotatable shaft, two sets of distributing elements carried by the shaft, the distributing elements of each set extending transversely across the beater and the distributing elements of one set overlapping the distributing elements of another set, the distributing elements of one set being alternately placed with relation to the distributing elements of the other set, each of said sets being independently reciprocable, and means for reciprocating one of said sets laterally toward one side of the machine and the other set laterally toward the other side of the machine.

5. A beater for fertilizer distributers including a rotatable shaft, two sets of transversely extending distributing elements arranged in alternate relation around the shaft and supported to rotate therewith, the distributing elements of one set overlapping the distributing elements of another set but extending parallel thereto, each of said sets being independently reciprocable, and cams, one for each set, said cams acting to reciprocate the said elements from the middle laterally in opposite directions.

6. A beater for fertilizer distributers including a rotatable shaft, distributing elements disposed parallel to the shaft, links operatively connecting the shaft and the distributing elements carrying the distributing elements with the shaft but permitting them to reciprocate longitudinally, and fixed means mounted on the shaft for reciprocating said elements.

7. A beater for fertilizer distributers including a rotatable shaft, members mounted on the shaft, distributing elements arranged parallel to the shaft, links pivotally connecting said members and the distributing elements and permitting a reciprocating movement of the distributing elements relative to the shaft, and a fixed cam operatively engaging the distributing elements to reciprocate the same.

8. A beater for fertilizer distributers including a rotatable shaft, members mounted on the shaft, distributing elements arranged parallel to the shaft, links pivotally connecting said members and the distributing elements and permitting a reciprocating movement of the distributing elements relative to the shaft, and a fixed cam operatively engaging the distributing elements to reciprocate the same, said cam being rotatably adjustable.

9. A beater for fertilizer distributers including a rotatable shaft, disks carried on the shaft, a plurality of distributing elements arranged parallel to the shaft, links pivotally connecting said disks with said distributing members and permitting a lateral reciprocation of the distributing members relative to the shaft, opposed fixed cams mounted on the shaft, one of said cams operatively engaging certain of the distributing elements and the other cam operatively engaging certain other of the distributing elements to reciprocate the same in opposite directions.

10. A beater for fertilizer distributers including a fixed shaft, disks mounted on the shaft, V-shaped links having inwardly extending terminal ends engaging sockets in said disks, said links being arranged radially upon the disks and having pivotal movement relative thereto, transversely extending distributing bars pivotally mounted upon the ends of said links for transverse reciprocation, sleeves surrounding the shaft at the ends thereof, means for holding said sleeves from rotation with the shaft, and oppositely disposed, oppositely inclined cams mounted upon said sleeves, each cam operatively engaging certain of the distributing bars whereby to reciprocate the distributing bars in opposite directions.

11. The combination with a wagon body of a fertilizer distributer, of a transverse shaft mounted in the sides of said body, means for rotating said shaft, radially disposed links mounted on the shaft, said links having free lateral movement, transverse distributing bars pivotally connected to the ends of said links, sleeves surrounding the ends of the shaft, each sleeve having a prolongation operatively engaging the sides of the wagon body to prevent the rotation of the sleeve with the shaft, cams mounted on the sleeve, the cams being inclined in opposite directions and each cam having a circumferential cam track, and pins projecting one from each of the distributing bars and operatively engaging said cam track, the pins of certain of the bars engaging one of said cams, the pins of certain other bars engaging the other cam whereby the bars may be given reciprocating movement in opposite directions.

12. In a machine for distributing compost or other material, the combination with the body of the vehicle, of a pulverizer and spreader mounted for rotation and comprising a plurality of sets of transversely extending distributing members, the members of each set extending entirely across the rear end of the vehicle and means for moving the sets laterally outward in directions opposite to each other, as the members move from a position adjacent to the vehicle body upward and outward to the rear of the vehicle body.

13. In a machine for distributing manure or other material, the body for containing compost, of a pulverizer and spreader mounted for rotation in the rear end thereof and including transversely extending distributing members having teeth thereon, the members being arranged in series one behind the other, and means for moving alternate supporting members laterally outward in one direction and the remaining supporting members laterally outward in the other direction as the pulverizer and spreader rotate.

In testimony whereof I affix my signature in presence of two witnesses.

HENRY SYNCK. [L. S.]

Witnesses:
F. V. LOCHTEFELD,
C. LOCHTEFELD.